Sept. 19, 1967 — A. O. RADKE ETAL — 3,342,528
SIDEWARDLY ADJUSTABLE SEAT BACK
Filed Dec. 13, 1965 — 2 Sheets-Sheet 2

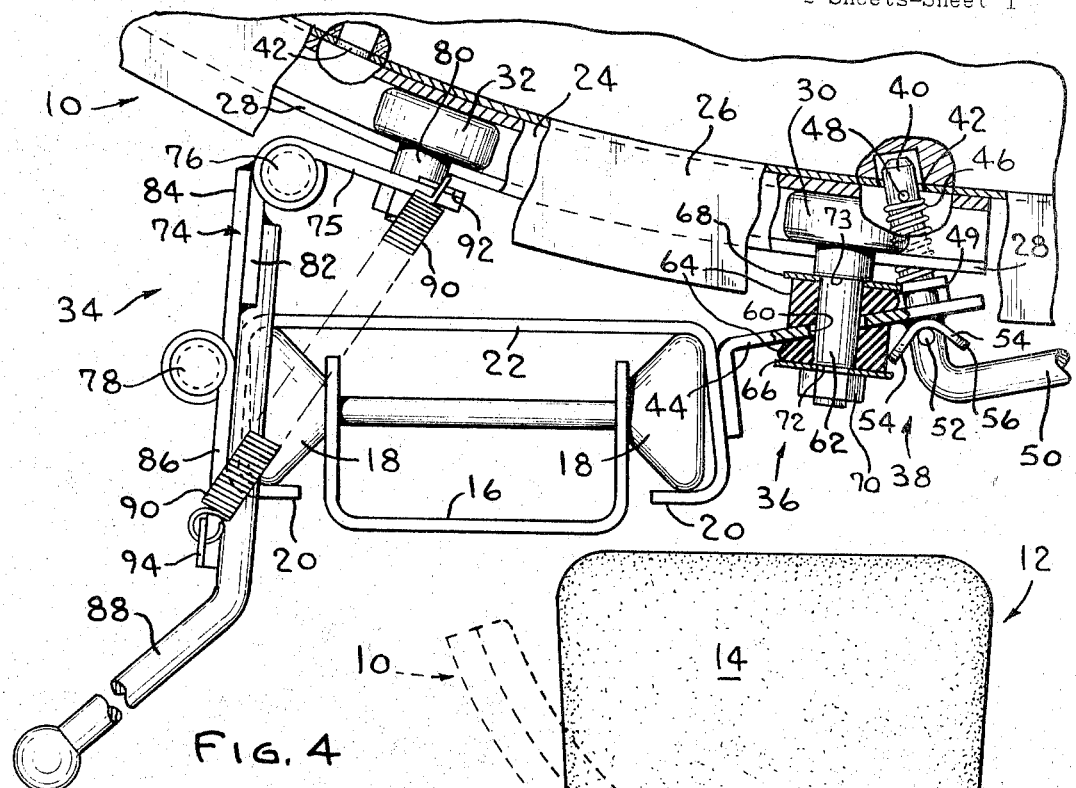
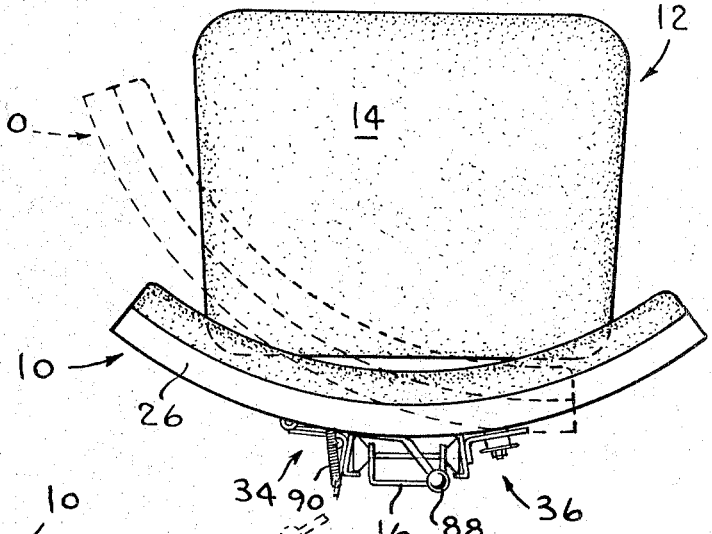
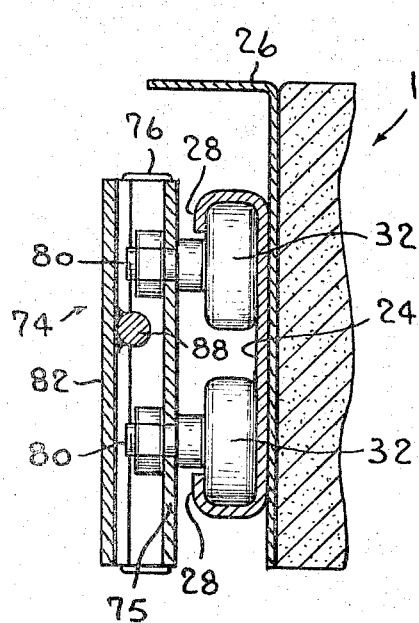

ARTHUR O. RADKE
WILLIAM L. WILTON
INVENTORS

ATTORNEY

United States Patent Office 3,342,528
Patented Sept. 19, 1967

3,342,528
SIDEWARDLY ADJUSTABLE SEAT BACK
Arthur O. Radke, Shorewood, and William L. Wilton, New Berlin, Wis., assignors to Bostrom Corporation, Milwaukee, Wis., a corporation of Wisconsin
Filed Dec. 13, 1965, Ser. No. 513,176
4 Claims. (Cl. 297—383)

ABSTRACT OF THE DISCLOSURE

The structure disclosed is essentially comprised of a seat back which is connected to the seat frame at the rear of the seat by a pivotal connection and a hinge connection. The hinge may be moved between a closed position at which the back member is in a normal back supporting position and an open position at which the back member is in a horizontally oblique position. When in the latter position, the seat back may be moved in the oblique plane through the aid of rollers, to a partial side and back supporting position.

---

This invention pertains to improvements in vehicle seats and particularly to an adjustment structure which permits the occupant to adjust the position of the seat's back part in respect to the seat part.

The principal object of the present invention is to provide an adjustment structure which will permit the occupant to shift the position of the back part from a normal back supporting position to a partial side and back supporting position.

Such adjustment structure is of particular significance in two types of seating applications. One of these is in machinery, such as tractors, in which the occupant often sits in a partial sidewardly facing position in order to observe work performed at the side of the machine. In such instances the seat can be improved both from a safety as well as from a comfort standpoint if the seat's back part is moved to an adjusted position at which the occupant's back will be equally well supported as under normal driving conditions. The second important application is in equipment which is frequently driven along (or cross-wise to) an inclining slope. Tractors also fall in this class, as do bulldozers, road graders, and many other road building machines. When the equipment travels along a substantial incline the seat, of course, will also be sloping sidewardly. In such cases the seat can be improved by moving the back part to the partial side and back supporting position to thereby oppose the occupant's tending to slide sidewardly.

Other objects and advantages will be pointed out in, or be apparent from, the specification and claims, as will obvious modifications of the single embodiment shown in the drawings, in which:

FIG. 1 is a top plan view of a vehicle seat which is equipped with the adjustment structure embodying the present invention, the back part being shown in the full lines in the normal back supporting position and in broken lines in the partial side and back supporting position;

FIG. 4 is a top view similar to that shown in FIG. 2 but with the adjustment structure shown in a position when the back part is in a partial side and back supporting position;

FIG. 5 is a cross-sectional view taken on line 5—5 of FIG. 2; and

Figure 2:
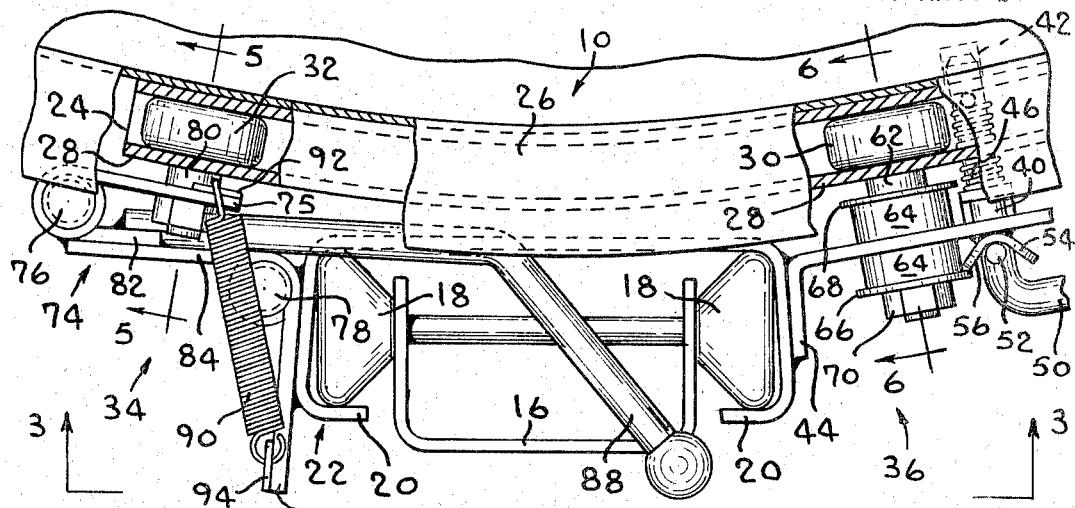
FIG. 2 is a fragmentary top plan view of the adjustment structure when the back part is in its normal position, with portions being broken away for the sake of clarity.
Figure 3:
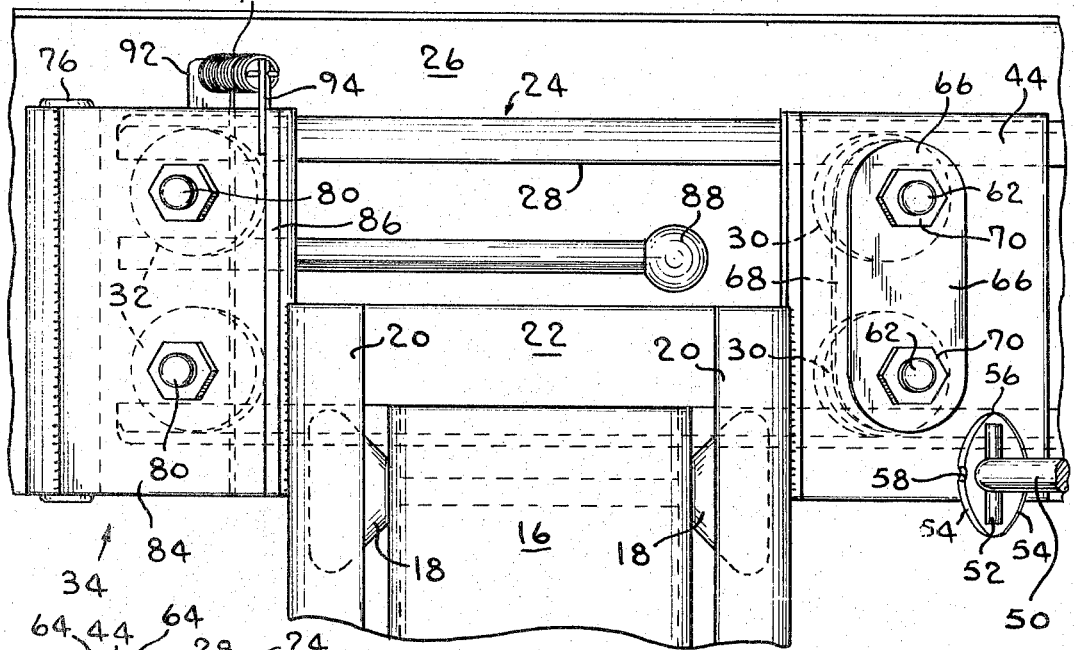
FIG. 3 is a back view of the adjustment structure taken on line 3—3 of FIG. 2.
Figure 6:
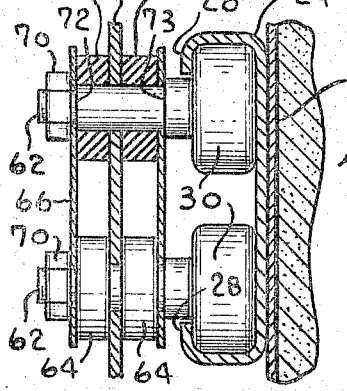
FIG. 6 is a cross-sectional view taken on line 6—6 of FIG. 2.

The novelty of the present invention resides in the adjustment structure which controls the relative planar position of the seat's back part 10 in respect to its seat part 12. The adjustment basically consists of moving the back part from a normally back supporting position, in which it generally extends in a plane parallel to the front of the seat part, to a position in which the back part is in a plane at an angle in respect to the front of the seat part. The latter position can be designated as a partial side and back supporting position. These positions are illustrated in FIG. 1, from which it can be seen that the adjustment essentially consists of "rotating" the back part around the center of the seat cushion 14 to a position in which some support will be provided at the rear of the seat part and some at one of its sides. In the broken line illustration of FIG. 1 the back part has been adjusted to provide proper support to an occupant who is facing at about 45° towards the right or to provide proper support to a forward facing occupant whose vehicle is traveling across a slope inclining upwardly from left to right.

The seat and base parts are both mounted on a suitable frame which in turn is connected through a spring suspension to the base of the seat. The design of the particular suspension and of the base has no bearing upon the present invention and therefore, except for the upstanding guide member 16 of the base, these parts are not shown in the drawings.

The guide member carries two rollers 18 which are engaged by the web and the inturned flange ends 20 of an upwardly extending channel shaped frame member 22 which connects the seat and back parts. Since the seat and back parts are connected by member 22 they oscillate as a unit in respect to the base of the seat. During this oscillation the path of the unit is controlled by the above described roller-track connection.

In the preferred embodiment shown in the drawings the "rotation" of the back part in respect to the seat part is attained by two separate movement components; a lateral movement and a pivotal movement. Although in most cases a combination of the lateral and pivotal movements is required in some special circumstances the occupant might desire only one change from the normal back supporting position.

The lateral movement is provided by a roller-track connection between the back part and the frame member 22. A channel shaped track 24 is fixed to exposed face of the back pan 26 and its inturned flanges 28 capture two sets of rollers, 30, 30 and 32, 32 which are connected to the frame member 22. The pivotal movement is provided by connecting one set of rollers (32, 32) to the frame member 22 through a hinge linkage 34 and by connecting the other set of rollers (30, 30) to the frame member through a horizontally pivotable connecting structure 36. Thus the back part can be moved laterally in any plane which is determined by the relative position of the two sets of rollers and the location of this plane can be varied in respect to the seat part by moving rollers 32, 32 in respect to rollers 30, 30. Suitable locking means are provided to lock the back part and the rollers in a preselected lateral and pivotal position.

The preferred construction of the adjustment structure can be best appreciated when comparing FIGS. 2 and 4 which show this structure in the normal and adjusted positions respectively. In both cases the locking mechanism 38 which controls the lateral movement is shown in a locking position. This mechanism is of known design and employs a bolt 40 which can be selectively engaged with any one of a number of apertures 42 provided in the rear face of the back part. The bolt is axially slidably mounted in a bracket 44 of the frame member 22 and is biased into an engaging position by a spring 46. The spring extends between a transverse pin 48 provided at the lower end of the bolt and an angle iron section 49 fixed to the inside face of bracket 44. The bolt is disengaged from the aperture by turning its handle 50 through 90°. The turning motion causes a transversely extending pin 52, provided on the outer end of the bolt, to ride on the outwardly sloping cam surfaces 54 of a cam member 56 (fixed to the bracket 44) and thereby causes a corresponding outward movement of the bolt. After 90° the pin 52 engages notches 58 to thereby retain the bolt in the disengaged position.

The pivotal connection of rollers 30, 30 to the frame member 22 is provided by transversely elongated slots 60 which receive the roller axle shafts 62, and by resilient rubber bushings 64 which are mounted on the axle shafts on each side of the bracket and which are maintained under some compression by retainer plates 66 and 68. The retainer plates are held by nuts 70 against shoulders 72 and 73 of the axle shafts. This construction provides a resilient connection which, due to the elongated slots, can be subjected to some pivoting in the horizontal plane.

The hinge linkage 34 has two movable links 74 and 75 which are connected to each other by a hinge pin 76. Link 74 is pivotally connected to the frame member 22 by a hinge pin 78 and link 75 is fixed to rollers 32 by bolts 80. As shown in the drawings, this linkage can be constructed from two hinges which have their leaves 82 and 84 welded together to form the link 74. In such case the other leaf 86 of one of the hinges is welded to the frame member to thereby fix the location of pin 78.

The hinge linkage can be moved between the closed and open positions by turning lever 88 which is fixed to link 74 and thus pivots around pin 78. As the lever is turned outwardly from the position shown in FIG. 2 to that shown in FIG. 4 link 74 will pivot in a clockwise direction around pin 78 and link 75 will pivot in a counter-clockwise direction in respect to pin 76. The opening of the hinge linkage will cause the back part to pivot away from the frame member 22 at 36 and at the same time will cause rollers 32 to travel towards rollers 30.

The hinge linkage is locked in the open as well as the closed position by coil spring 90 which is engaged with link 75 at a tab 92 and with the frame member at a tab 94. When the linkage is in the closed position (FIG. 2) the spring 90 exerts a counter-clockwise or closing bias around pin 78. As the linkage is opened the spring moves over pin 78 to a position in which it exerts a clockwise or opening bias.

The disclosed adjustment structure has only one hinge linkage and therefore can only be adjusted to provide support on one side of the seat. The reason for this disclosure is that in many commercial applications the machinery which performs the work to be watched by the occupant is almost always connected to on one side of the vehicle, and therefore the expense for providing a seat back adjustment structure which is adjustable to both sides is not warranted. However, it should be apparent that a pivotal connection can be combined with a hinge linkage by merely connecting the rollers 32 to the link 75 by a slot and resilient bushings in the same manner as rollers 30 are connected to bracket 44. Thus, if a hinge linkage were substituted for bracket 44 and if both sets of rollers were connected to the outer link (75) by the pivotal connecting means, adjustment to both sides of the seat could be provided.

Although but a single embodiment of the present invention has been illustrated and described, it will be apparent to those skilled in the art that various changes and modifications may be made therein without departing from the spirit of the invention or from the scope of the appended claims.

We claim:
1. A vehicle seat according to claim 2 wherein said first connecting member has a portion which extends through a horizontally elongated slot in said frame means to permit some pivotal motion of said portion in said slot, and wherein said portion cooperates with resilient means which is adjacent said frame member at said slot to provide some biasing to said pivotal motion.

2. In a vehicle seat,
a seat part,
a back part,
frame means connecting said back part to said seat part,
connecting means connecting said back part to said frame means for motion in a generally horizontal plane between a normal back-supporting position and a partial siide and back supporting position; said connecting means being comprised of a first and a second connecting member; both of said members being connected to said back part by anti-friction means to permit relative horizontal movement between said back part and said members; the first of said members being pivotally attached to said frame means to permit said back part to be pivoted in respect to said frame means at the point of attachment between said first member and said frame means; and
the second of said members being pivotally attached to said frame means and including a hinge joint intermediate its points of attachment to said frame means and said back part to thereby permit said back part to move towards and away from said frame means as it is pivoted at said connection of said first member and said frame means.

3. In a vehicle seat,
a seat part,
a back part,
frame means connecting said back part to said seat part,
connecting means connecting said back part to said frame means for motion in a generally horizontal plane between a normal back-supporting position and a partial side and back supporting position; said connecting means including a first and a second connecting member; said first member being connected to said back part by an anti-friction connecting structure to permit relative horizontal movement of said back part in respect to said member; and said second member being connected to said frame means by pivotal connecting means; said first connecting member being connected to said frame means by a hinge linkage having a first link pivotally connected to said frame means and having a second link which is pivotally connected at one of its ends to said first link and which is connected at its other end to said anti-friction connecting structure,
lever means connected to said first link and operable to move said link from a closed position in respect to said second link to an open position in respect thereto to thus cause said back part to pivot around said pivotal connecting means; and
spring means connecting said second link to said frame means and exerting a closing bias on said hinge linkage when said links are in said closed position and an opening bias on said linkage when said links are in said open position.

4. In a vehicle seat,
a seat part,
a back part,
frame means provided at the rear of said seat part and connecting said back part to said seat part,
connecting means connecting said back part to said frame means for motion in a generally horizontal plane between a normal back-supporting position and a partial side and back supporting position,
said connecting means including pivotal means which connects said back member to said frame means for pivotal generally horizontal movement around a point generally at the rear of said seat part to thereby pivot said back part between a vertical plane in which it provides normal back support to a second vertical plane in which said back part is oblique to said first mentioned vertical plane, said connecting means further including means which permit said back part to be horizontally moved in respect to said frame means while said back part is maintained generally in said second vertical plane to thereby move said back part to said partial side and back supporting position; and locking means for maintaining said back part in said normal and said partial supporting positions.

References Cited

UNITED STATES PATENTS

| | | | |
|---|---|---|---|
| 937,343 | 10/1909 | Wallace | 297—407 |
| 2,219,799 | 10/1940 | Zuck et al. | 297—407 |
| 2,568,988 | 9/1951 | Childs | 297—383 X |
| 2,872,698 | 2/1959 | Gommels | 16—163 |
| 3,145,053 | 8/1964 | Thompson et al. | 297—383 |

CASMIR A. NUNBERG, *Primary Examiner.*